United States Patent [19]

Kadokura et al.

[11] Patent Number: 4,842,708

[45] Date of Patent: Jun. 27, 1989

[54] PERPENDICULAR MAGNETIC RECORDING MEDIUM, METHOD FOR PRODUCING THE SAME, AND SPUTTERING DEVICE

[75] Inventors: Sadao Kadokura, Hachioji; Kazuhiko Honjo; Takashi Tomie, both of Hino; Masahiko Naoe, Tokyo, all of Japan

[73] Assignee: Teijin Limited, Osaka, Japan

[21] Appl. No.: 22,664

[22] Filed: Mar. 6, 1987

Related U.S. Application Data

[62] Division of Ser. No. 819,229, Jan. 15, 1986, Pat. No. 4,666,788, which is a division of Ser. No. 466,863, Feb. 16, 1983, Pat. No. 4,576,700.

[30] Foreign Application Priority Data

Feb. 16, 1982 [JP] Japan .................................. 57-22080
Mar. 31, 1982 [JP] Japan .................................. 57-20975

[51] Int. Cl.$^4$ .............................................. C23C 14/00
[52] U.S. Cl. .................................................... 204/298
[58] Field of Search ............... 204/298, 192.1, 192.12, 204/192.2, 298 ME, 298 SG, 298 PM

[56] References Cited

U.S. PATENT DOCUMENTS

| 3,945,903 | 3/1976 | Svendor et al. | 204/298 |
| 4,279,678 | 11/1981 | Meckel | 204/192.2 |
| 4,324,630 | 4/1982 | Sugita et al. | 204/192.12 |
| 4,331,526 | 5/1982 | Kuehnle | 204/298 |
| 4,361,472 | 11/1982 | Morrison | 204/192.12 |
| 4,401,539 | 8/1983 | Abe et al. | 204/192.13 |
| 4,407,894 | 10/1983 | Kadokura et al. | 204/192.2 |
| 4,441,974 | 4/1984 | Nishikawa et al. | 204/298 |
| 4,582,720 | 4/1986 | Yamazaki | 204/298 |

FOREIGN PATENT DOCUMENTS

| 0053680 | 3/1984 | Japan | 204/298 |
| 0116376 | 7/1984 | Japan | 204/298 |
| 0046370 | 3/1985 | Japan | 204/298 |
| 0106966 | 6/1985 | Japan | 204/298 |
| 1034175 | 2/1986 | Japan | 204/298 |
| 1034176 | 2/1986 | Japan | 204/298 |

OTHER PUBLICATIONS

Kadokura et al., "Deposition of Co–Cr Films for Perpendicular Magnetic Recording by Improved Opposing Targets Sputtering" IEEE Transactions on Magnetics, vol. Mag 17, No. 6 (Nov. 1981) pp. 3175–3177.

Norstrom, "The Electrical Characteristics of RF Magnetron and non-Magnetron Planar Systems" Pergamon Press, Jun. 1980, p. 225.

Naoe et al., "High Rate Deposition of Magnetic Films by Sputtering from Two Facing Targets" J. Crystal Growth 45, No. 1, Dec. 1978, p. 361.

Primary Examiner—John F. Niebling
Assistant Examiner—Steven P. Marquis
Attorney, Agent, or Firm—Burgess, Ryan & Wayne

[57] ABSTRACT

A magnetic recording medium conventionally utilizes the in-plane magnetization mode, but recently the perpendicular magnetization mode utilizing the perpendicular anisotropy of an hcp cobalt alloy layer, in which the C axis is oriented perpendicular to the layer surface, has been proposed. The known perpendicular magnetic recording medium is produced by means of RF sputtering and comprises a Permalloy layer, as layer of a low coercive-force material, between the nonmagnetic base and the hcp cobalt alloy layer. The perpendicular anisotropy attained by the present invention in very excellent and is superior to that of a perpendicular recording medium having no Permalloy layer because a Co-Ta alloy is used as the layer of a low coercive-force material.

4 Claims, 12 Drawing Sheets

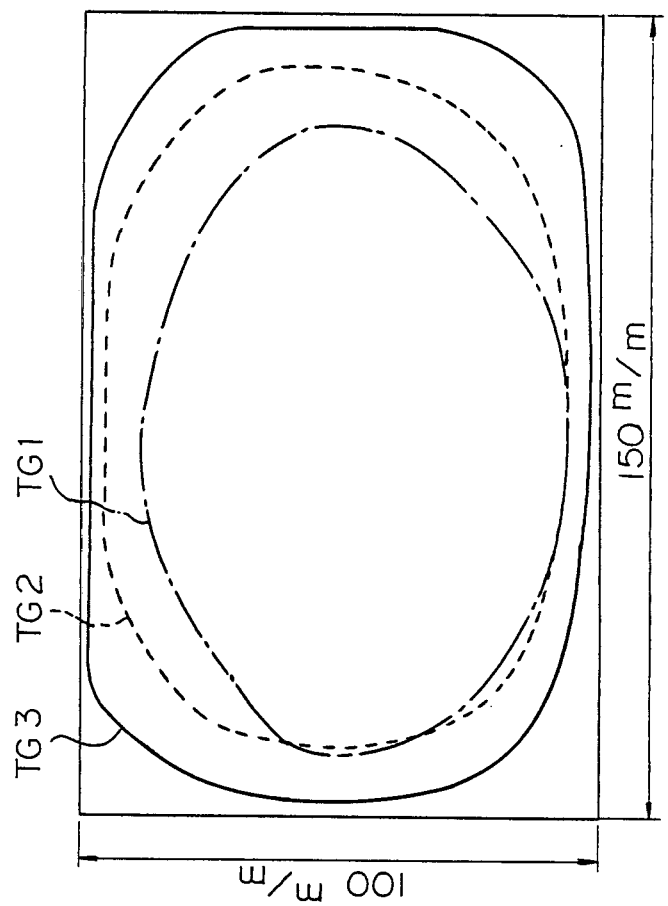

PERPENDICULAR MAGNETIC RECORDING MEDIUM, METHOD FOR PRODUCING THE SAME, AND SPUTTERING DEVICE

This is a division of application Ser. No. 819,229, filed Jan. 15, 1986, now U.S. Pat. No. 4,666,788, issued May 19, 1987 which is a divisional of U.S. Ser. No. b 466,683 filed Feb. 16, 1983, now U.S. Pat. No. 4,576,700, issued Mar. 18, 1986.

The present invention relates to a perpendicular magnetic recording medium of a cobalt alloy which comprises mainly cobalt, and additionally chromium, and a method for producing the same. More particularly, the present invention relates to a perpendicular magnetic recording medium comprising a nonmagnetic base, a layer of a low coercive force material, and a layer of a cobalt alloy, as well as a method for producing the same. In addition, the present invention also relates to an improved sputtering device.

The present magnetic recording systems fundamentally use the longitudinal (in-plane) magnetization mode, that is, a magnetization being parallel to the base, to which the cobalt alloy is applied.

Iwasaki has proposed in IEEE Transactions on Magnetics, Vol. MAG-16, No. 1, January 1980, pages 71 to 76 a perpendicular magnetic recording system which theoretically makes it possible to produce a higher recording density than one produced by using the longitudinal magnetization mode. In the perpendicular magnetic recording system, the magnetization perpendicular to the surface of the magnetic recording layer is used for recording.

The magnetic layer adapted to the perpendicular magnetization system should be an alloy layer mainly consisting of cobalt and additionally chromium and should have a magnetic anisotropy perpendicular to the layer surface. This magnetic anisotropy, i.e., perpendicular magnetic anisotropy, should usually have the relationship $HK \geq 4\pi Ms$, wherein Hk and $4\pi Ms$ are the anisotropy field and the maximum demagnetizing field of a magnetic layer, respectively. This relationship designates that the magnetic layer possesses a satisfactorily high perpendicular anisotropy.

In the alloy layer mentioned above, the direction of easy magnetization, i.e., the C axis of the hexagonal cobalt alloy, is oriented perpendicular to the layer surface. Such orientation is referred to as perpendicular orientation and is evaluated by subjecting a magnetic film to X-ray diffraction, obtaining the rocking curve of the diffraction peak from the (002) plane of the hexagonal closest packing (hcp) structure, and measuring the half value width $\Delta\theta_{50}$ of the rocking curve. A half-value width $\Delta\theta_{50}$ of 10° or less is alleged to be sufficient for obtaining excellent perpendicular anisotropy. The coercive force $H_{cv}$ in the perpendicular direction, which is more than 100 Oersted (Oe), is allegedly sufficient for obtaining an excellent perpendicular orientation.

U.S. Pat. No. 4,210,946 proposes a perpendicular magnetic recording medium (hereinafter referred to as a two-layer film) which is suitable for effectively recording and/or regenerating signals from a single-pole-type magnetic recording head. More specifically, U.S. Pat. No. 4,210,946 discloses a layer of low coercive force material consisting of Permalloy and a layer of a 5% to 25% by weight of chromium-cobalt alloy successively deposited on a nonmagnetic base by means of an RF sputtering method, the target electrode and the base being disposed opposite to one another. The two-layer film disclosed in U.S. Pat. No. 4,210,946 allegedly provides a high recording density and a high output.

It is known that the half-value width $\Delta\theta hd 50$ of a cobalt alloy, is increased and the perpendicular magnetic anisotropy, is deteriorated more when Permalloy is used for the layer of low coercive force material, as compared with the half value width $\Delta\theta_{50}$ a perpendicular magnetic recording medium which does not comprise a layer of low coercive force material (Uesaka et al. Technical Report S7-1. "Two-Layer Films for Perpendicular Recording Medium"). This perpendicular magnetic recording medium is hereinafter referred to as a one-layer film. In the RF sputtering method used in U.S. Pat. No. 4,210,946, it is necessary to use as the nonmagnetic base an expensive heat-resistant macromolecular material film, such as a polyimide film, because the temperature of the nonmagnetic base is increased during RF sputtering. If an inexpensive macromolecular material film, such as a polyester film, is used as the nonmagnetic base, the deposition rate film is decreased and the RF sputtering device must be provided with a specified cooling means. An RF sputtering method cannot be applied in the large-scale production of or high-speed growth of perpendicular magnetic recording mediums because the highest growth rate of a cobalt alloy layer which can be achieved at present by means of the RF sputtering method is about 500 Å per minute even when a polyimide film is used as the nonmagnetic base. In addition, since the one-layer film or two-layer film obtained by means of the RF sputtering method exhibits a poor flexibility, it may cause the magnetic head to wear or may be damaged by the magnetic head when used for recording or regenerating signals.

It is an object of the present invention to provide a two-layer film in which the perpendicular orientation is not reduced due to the layer of low coercive-force material.

It is another object of the present invention to provide a method for producing a two-layer film at such an enhanced rate of production as to make the method commercially applicable. The method should make it possible to use a less expensive and a low heat-resistant film, such as a polyester film, as the nonmagnetic base of the two-layer film.

It is yet another object of the present invention to provide a sputtering device which allows uniform and high-peed formation of a magnetic layer, particularly a perpendicular magnetic recording layer, and a layer of low coercive-force material.

In accordance with the objects of the present invention, there is provided a perpendicular magnetic recording medium (a two-layer film) comprising a nonmagnetic base and two magnetic layers successively formed on the nonmagnetic base, i.e., a layer of low coercive-force material and a layer of a cobalt alloy and having a direction of easy magnetization in a direction perpendicular to the film surface, characterized in that the layer of low coervice-force material consists of an alloy which is mainly composed of cobalt and additionally tantalum.

The two-layer film according to the present invention is characterized by using as the layer of low coercive-force material an alloy (hereinafter referred to as a Co-Ta alloy which is mainly composed of cobalt and additionally contains tantalum. This alloy can provide a cobalt alloy (hereinafter referred to as a Co-Cr alloy) layer having a very improved perpendicular orientation, which in turn leads to provide the two-layer film having a high recording density. In the perpendicular magnetic recording technique, to attain a high recording density, it is important that the perpendicular coercive force $H_{cv}$ of the perpendicular magnetic recording medium matches the magnetic characteristics of the recording and/or regenerating head. In accordance with the characteristics of a magnetic recording system to which the perpendicular magnetic recording medium is applied, the perpendicular coercive force $H_{cv}$ is determined within the range of from 200 to 1300 Oe. In determining the perpendicular coercive force $H_{cv}$, it is crucial that the magnetic anisotropy of the Co-Cr alloy layer in terms of the half-value width $\Delta\theta_{50}$ be excellent. The perpendicular magnetic anisotropy of the two-layer film of the present invention is very excellent and is surprisingly superior to that of a one-layer film. The reason why such an excellent perpendicular magnetic anisotropy can be obtained is not clear but appears to be as follows.

When there is only a trace of Ta in the Co-Ta alloy layer, the most energetically stable Co crystals are those which are oriented perpendicular to the surface of the Co-Ta alloy layer, and in which the distance between the C planes of hcp crystals are enlarged due to Ta atoms. When the Co-Cr alloy is deposited on the surface of the Co-Ta alloy layer contain only a trace of Ta, mismatching of the crystal lattices occurs locally between the Co-Ta alloy layer and the Co-Cr alloy layer because the lattice constants of these two alloys are slightly different from one another. In this case, the perpendicular orientation of the Co-Cr alloy is low.

When the Ta concentration of the Co-Ta alloy layer becomes high, the Co atoms in the Co-Ta alloy is disarranged as compared with that of the hcp crystals, that is, disordering of the Co atoms takes place. Since the Co-Ta alloy tends to exhibit unclear grain boundaries in proportion to the degree of disordering of the Co atoms, the Co-Ta alloy layer is uniform when observed microscopically. Such uniformity results in a smooth Co-Ta alloy layer surface as well as in the elimination of local mismatching between the Co-Cr alloy crystals and the Co-Ta crystals. When the Co-Cr alloy is deposited on the uniform and smooth Co-Ta alloy layer, Co atoms of these layers are brought into contact with each other at the beginning of deposition, and during deposition the Co crystals grow perpendicularly and form crystal lattices which are oriented perpendicular to the film surface.

In accordance with the objects of the present invention, there is also provided a method for producing a perpendicular magnetic recording medium (two layer film), comprising the steps of: forming said Co-Ta alloy layer by a sputtering method (hereinafter referred to as an opposed target sputtering method), wherein a magnetic field is generated in a direction perpendicular to the surfaces of a pair of targets arranged opposite to one another within a sputtering device, and said hcp cobalt alloy layer is deposited on the base, which is located beside a space between said pair of targets and which faces said space; and, forming said cobalt alloy layer by the opposing target sputtering method.

In accordance with the objects of the present invention, there is also provided a sputtering device, comprising:
  a vacuum vessel;
  at least one pair of opposed targets disposed in the vacuum vessel;
  a means for generating a magnetic field between the at least one pair of opposed targets in a direction perpendicular to opposed the targets, the means being located behind the targets; and
  at least one pair of conveyable holders for a nonmagnetic base, each of the conveyable holders being located beside and facing a space between the at least one pair of targets, and being conveyed in a direction perpendicular to the targets, layers having the composition of the targets being deposited on the nonmagnetic base by sputtering.

The embodiments of the present invention are described hereinafter.

According to one embodiment, the Ta concentration of the Co-Ta alloy is at least 15% by weight or at least 6.4 atomic %. In this case, the coercive force in plane $H_c$ of the Co-Ta alloy is very low, e.g., 100 Oe at the highest. Furthermore, the Co-Cr alloy layer on the Co-Ta alloy layer has a half-value width $\Delta\theta_{50}$ of ten degrees or less.

According to another embodiment of the present invention, the Co-Ta alloy, i.e., the layer of low coercive-force material alloy, is amorphous. An amorphous Co-Ta alloy exhibits no magnetic anisotropy. That is, an amorphous Co-Ta alloy has no magnetic anisotropy imparted to it by its crystal structure. In addition, an amorphous Co-Ta alloy exhibits a very low coercive force in plane $H_c$ of, for example, 5 Oe or less, a very low half-value width $\Delta\theta_{50}$ of four degrees or less, a high permeability, and a high resistivity. The two-layer film, in which the Co-Ta layer is amorphous and thus exhibits the above-described properties, is very effective for enhancing the recording sensitivity when it is used for high-density and high-speed recording. A conventional layer of low coercive-force material, i.e., crystalline material, such as permalloy, has a magnetic anisotropy which results in a reduction in permeability and an increase in watt loss, including hysteresis loss and eddy-current loss. Therefore, when a conventional two-film layer comprising a Permalloy layer is used for high-density recording, the S/N ratio is disadvantageously low. This disadvantage can be eliminated by using the amorphous Co-Ta alloy layer of the present invention.

In addition, since the amorphous Co-Ta alloy of the present invention exhibits the above-described properties, the layer of low coercive-force material can be made very thin, which is advantageous from an economical point of view. In addition to the above-described properties, the Curie point of the amorphous Co-Ta alloy is high. It is therefore possible to attain magnetic characteristics which is thermally stable. Furthermore, the amorphous Co-Ta alloy is highly corrosion-resistant and is therefore advantageous for practical use.

According to an embodiment of the present invention, the Co concentration of the Co-Ta alloy is at least 50 atomic % (24 wt %). Preferably, the Co concentration of the Co-Ta alloy is virtually the same as that of the Co-Cr alloy. According to this embodiment, the interface between the Co-Ta alloy layer and the Co-Cr alloy layer is mechanically very stable because both of the layers have expansion coefficients and specific heats which are commensurate to each other and further because the wettability between the layers is good. In addition, a solid solution may form at the interface between the Co-Ta alloy and the Co-Cr alloy.

A conventional layer of low coercive-force material, e.g., an iron-based alloy, such as Permalloy, is liable to oxidize or undergo deterioration of its properties during the formation thereof.

According to another embodiment, the Co-Cr alloy contains from 10% to 25% by weight of Cr and may contain an additional element or elements, such as W, Mo, Ru, Pt, Os, Ni, Re, Ta, or the like. The concentration of the additional element or elements must be such that the known perpendicular magnetic anisotropy induced due to C-axis orientation in the hcp crystals is not impaired. Preferably, Ta is contained in the Co-Cr alloy at a concentration of from 2 to 10 atomic % with the proviso that sum of Ta and Cr concentrations is 27 atomic % at the highest.

According to yet another embodiment, the nonmagnetic base consists of a polyimide film or, preferably, a polyester film.

The preferred embodiments of the present invention are hereinafter described with reference to the drawings, wherein.

Figure 3:
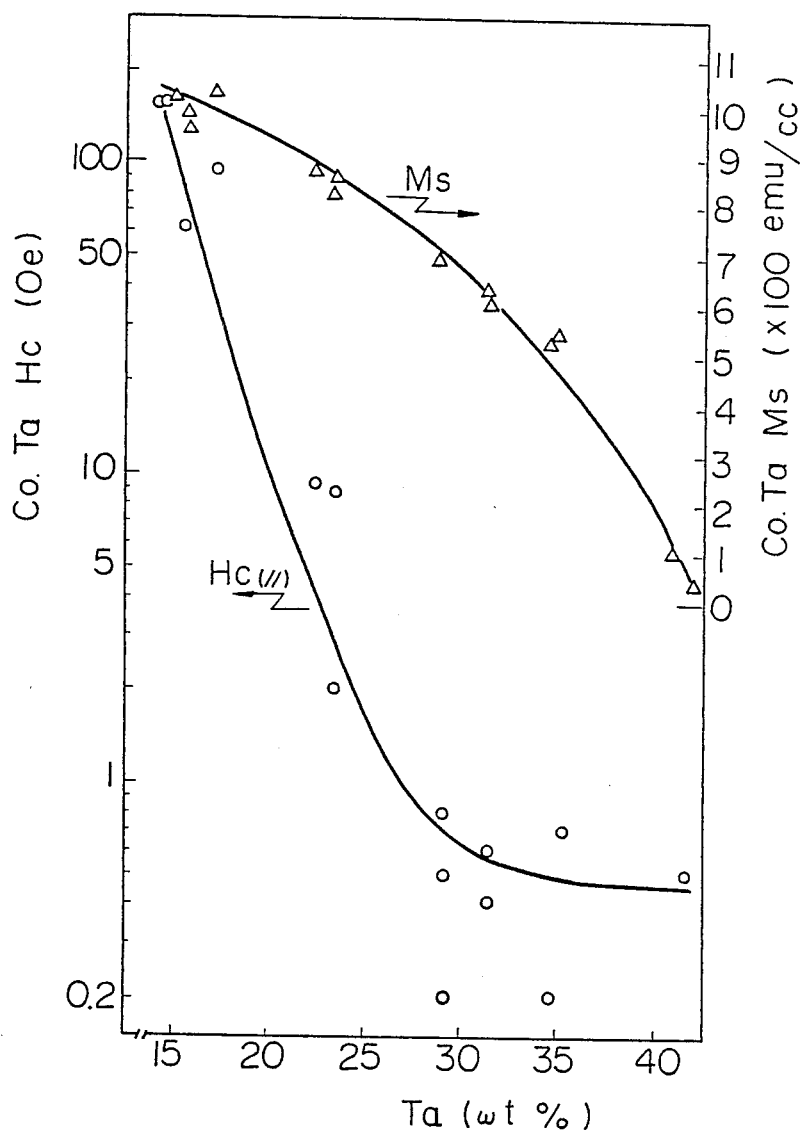
Figure 5:
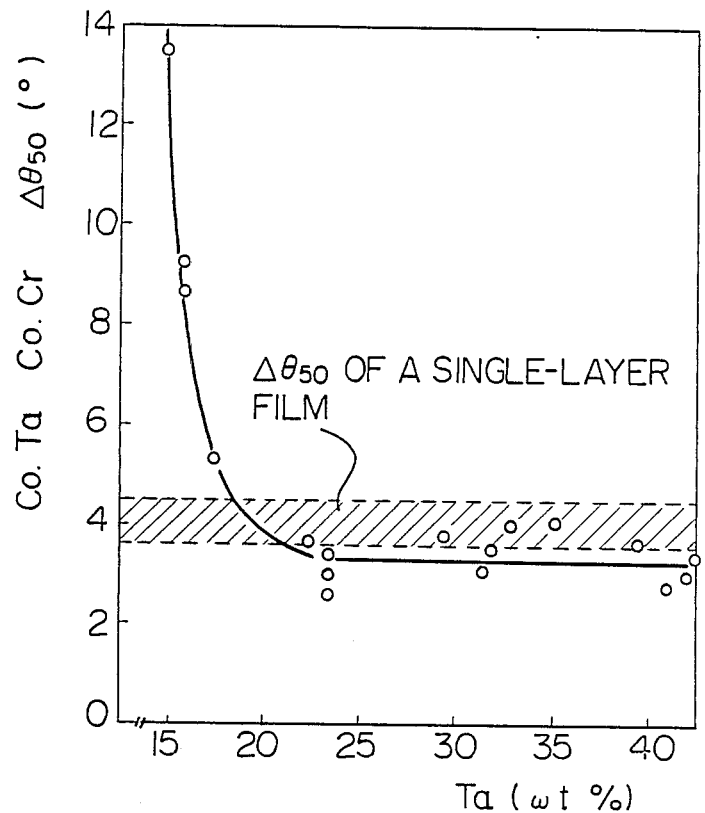
Figure 6:
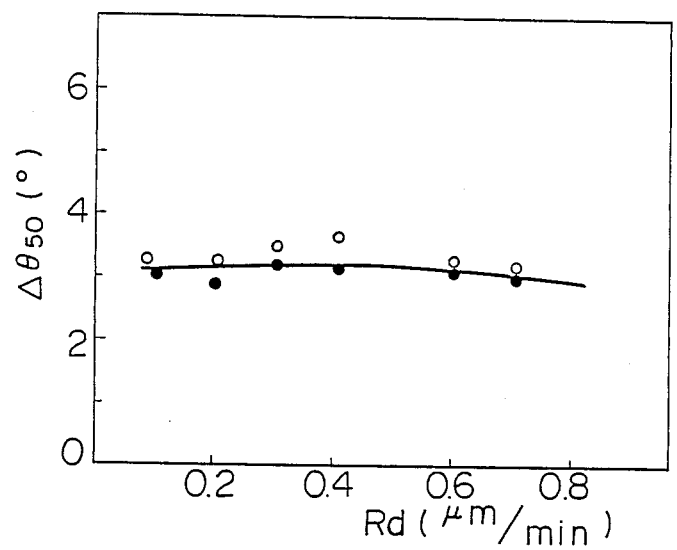
Figure 13:
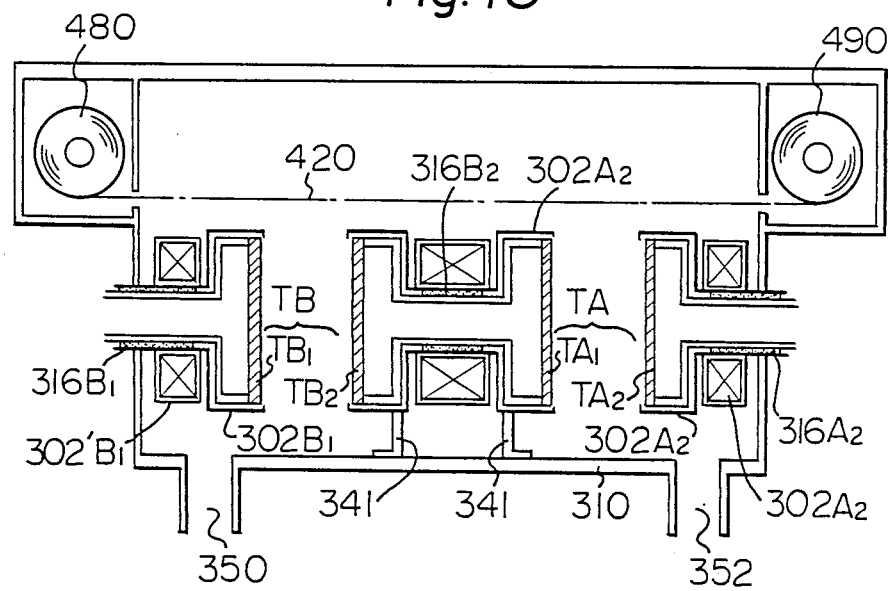
Figure 7:
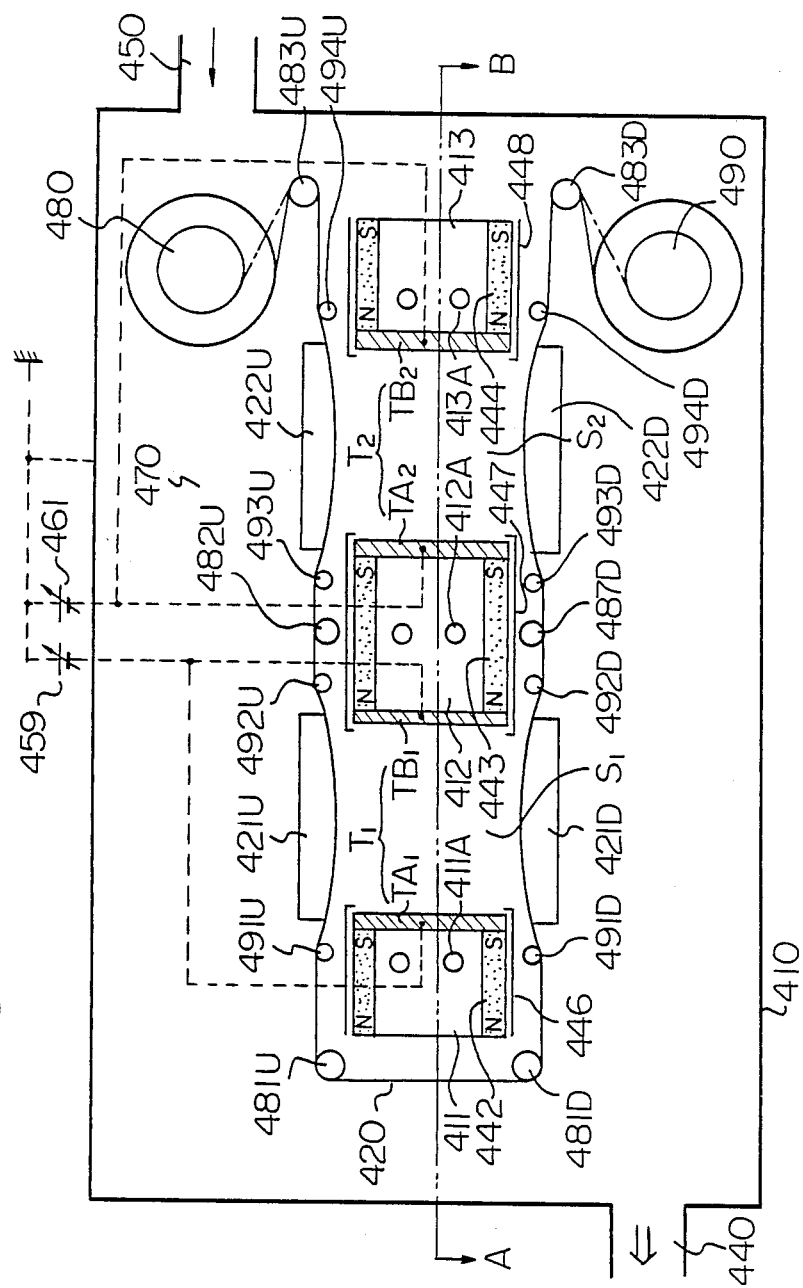
Figure 8:
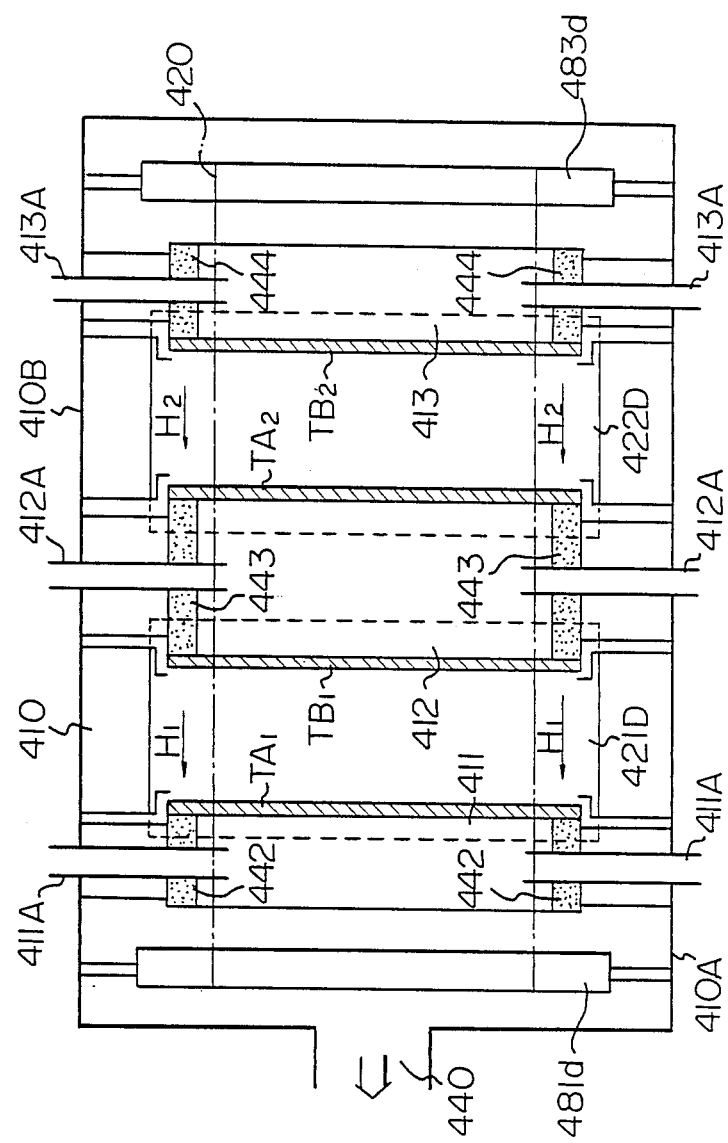
Figure 9:
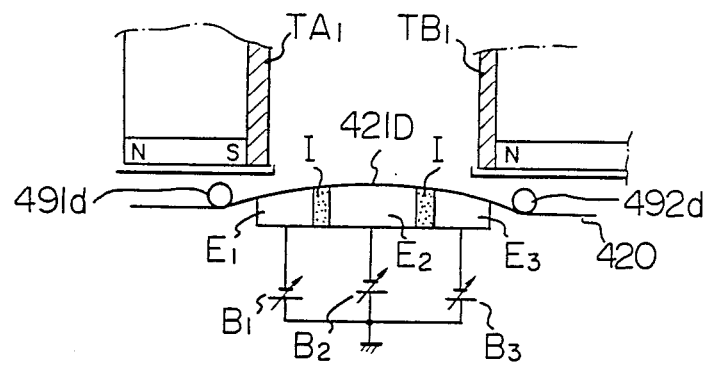
Figure 10:
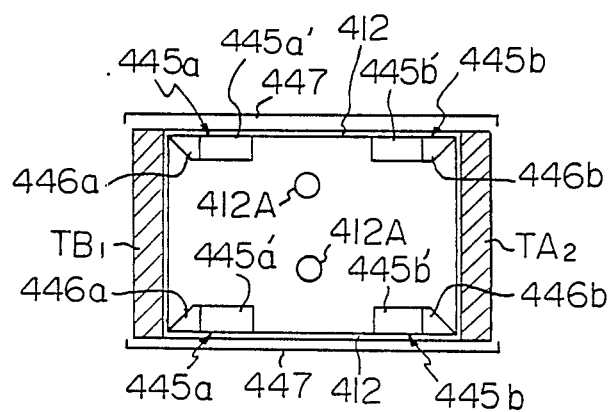
Figure 11:
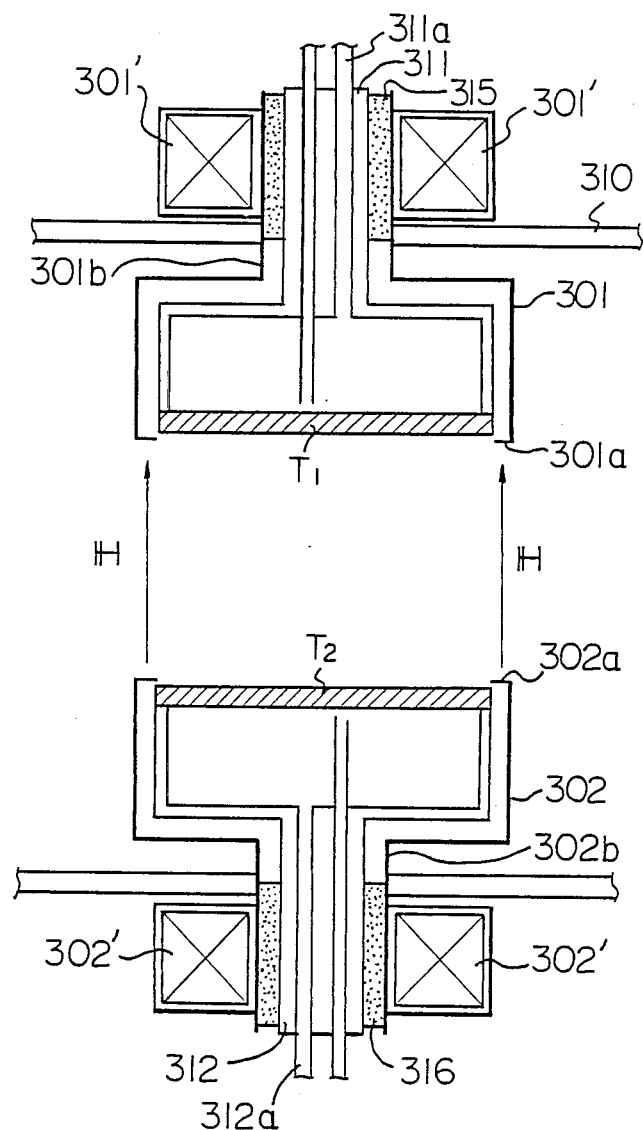
Figure 12:
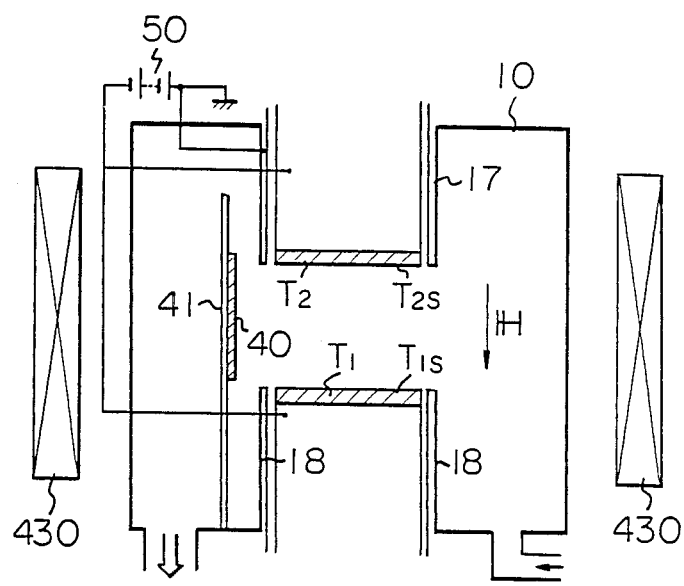
Figure 14:
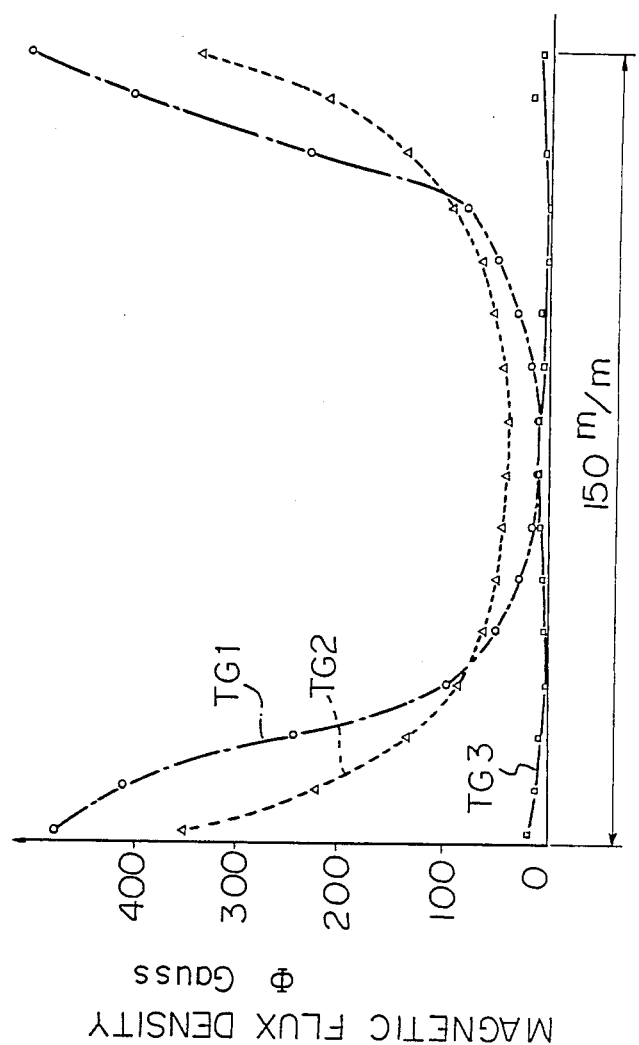

FIGS. 3, 5, and 6 are graphs illustrating the experimental results obtained in Example 1;

FIGS. 7 and 8 illustrate embodiments of the sputtering device according to the present invention;

FIG. 9 is a partial view of FIG. 7;

FIG. 10 illustrates the arrangement of magnets in a target;

FIGS. 11 through 13 illustrates sputtering devices which can be used for implementing the method of present invention; and FIGS. 14 and 15 are drawings illustrating the magnetic flux density and erosion of a target, respectively.

Figure 1:
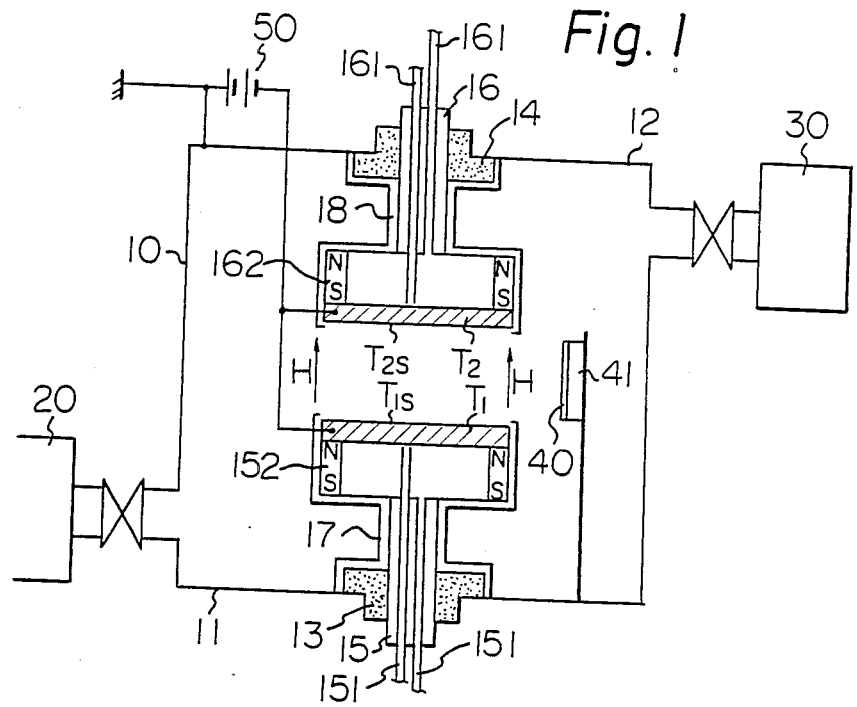
FIG. 1 is a sputtering device used for implementing the method of the present invention.

Referring to FIG. 1, a sputtering device with a pair of opposed targets is illustrated. This sputtering device, with a pair of opposed targets, which is used to prepare films made of perpendicular-oriented materials is disclosed in European Patent Publication No. 0054269.

The sputtering device with a pair of opposing targets, is hereinafter simply referred to as opposed targets sputtering device. The device comprises a vacuum vessel 10 and a pair of targets $T_1$, $T_2$ which are closely attached or secured to the target holders 15, 16. The targets $T_1$, $T_2$ are arranged opposite one another so that their surfaces, which are subjected to sputtering, i.e., the sputtering surfaces $T_{1S}$, $T_{2S}$, face one another over the space between the targets $T_1$, $T_2$ which are parallel to one another.

The target holders 15, 16 are secured to the side plates 11, 12 of the vacuum vessel 10 via the insulating members 13, 14. The targets $T_1$, $T_2$, as well as the permanent magnets 152, 162, are cooled by water, which is admitted into the target holders 15, 16 via the cooling conduits 151, 161. The permanent magnets 152, 162 are means for generating a magnetic field perpendicular to the sputtering surfaces $T_{1S}$, $T_{2S}$ and are arranged in such a manner that the N pole of one of the permanent magnets faces the S pole of the other permanent magnet. A magnetic field is generated only between the targets $T_1$, $T_2$. The target holders 15, 16 and the insulating members 13, 14 are protected by the shields 17, 18 from plasma particles formed during sputtering. The shields 17, 18 prevent an abnormal electric discharge from occuring at places other than the targets $T_1$, $T_2$.

The nonmagnetic base 40 on which the magnetic layers are formed by the opposed target sputtering method is located on the base holder 41 disposed beside the targets $T_1$, $T_2$ so that the nonmagnetic base 40 is located beside the space between the targets $T_1$, $T_2$ and faces this space. The base holder 41 is usually positioned perpendicular to the sputtering surfaces $T_{1S}$, $T_{2S}$.

Reference numeral 50 denotes a sputtering power source, which is a direct current source to which the targets $T_1$, $T_2$ and a ground terminal are connected as a cathode and an anode, respectively. The sputtering power is applied between the targets $T_1$, $T_2$ and the grounded vacuum vessel.

A retractable shutter (not shown) is disposed between the nonmagnetic base 40 and the targets $T_1$, $T_2$ as to protect the nonmagnetic base 40 from plasma during the pre-sputtering period. The vacuum vessel 10 is provided with a gas-exhaust port which communicates with a gas-exhaust system 20 and a gas-intake port which communicates with a gas source 30.

When operating the opposed-targets sputtering device described above, the gas exhaust system 20 is preliminarily operated so as to satisfactorily withdraw the gas in the vacuum vessel 10 through the gas exhaust port, and, subsequently, a sputtering gas, such as an argon gas, is admitted into the vacuum vessel 10 from a gas source 30 so that the pressure in the vacuum vessel 10 is increased to a predetermined level, for example, from $10^{-1}$ to $10^{-4}$ Torr.

In the opposed targets sputtering device shown in FIG. 1, the magnetic field H is perpendicular to the sputtering surfaces $T_{1S}$, $T_{2S}$. Due to the layout and configuration of the targets $T_1$, $T_2$, high-speed sputtering at a low temperature can be realized. That is, the ionized sputtering gas and gamma electrons which are expelled from the sputtered targets are confined in the space between the targets $T_1$, $T_2$, with the result that high-density plasma is formed between the targets $T_1$, $T_2$. It is believed that high-speed growth of the magnetic layers can be achieved by confinement of the high-density plasma. Since the nonmagnetic base is offset from the targets $T_1$, $T_2$, heat generation due to the impinging effects of the electrons on the nonmagnetic base 40 is not appreciable and therefore magnetic layers can be formed at a low temperature.

Figure 2:
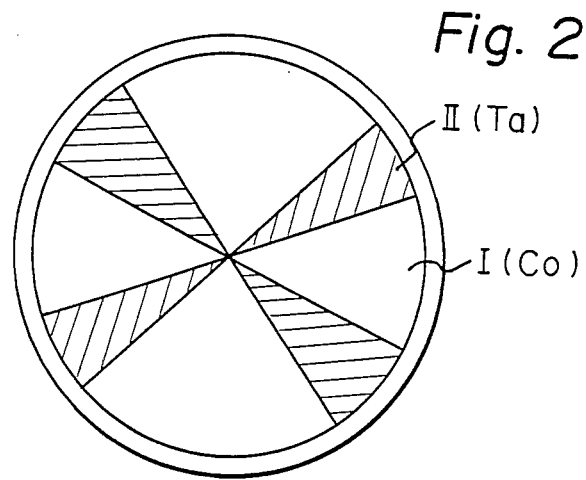
FIG. 2 is a target used for forming a Co-Ta alloy layer.

Referring to FIG. 2, a preferred embodiment of a target is illustrated. The surface of the target is divided into eight fan-shaped zones. The fan-shaped zones II (Ta) consist of 100% Ta and the fan-shaped zones I (Co) consists of 100% Co. The Ta concentration of the Co-Ta alloy can be adjusted by determining the proportion of the surface area of the former zones to that of the latter zones.

The opposed-targets sputtering device shown in FIGS. 7 and 8 comprises the vacuum vessel 410. The vacuum vessel 410 is provided with a gas-exhaust port 440 and a gas-intake port 450 which are connected to the not-shown gas-exhaust system and to the not shown gas source, respectively.

The opposed-targets sputtering device is provided with a plurality of pairs of opposed targets which are arranged in rows and which realize multi-stage sputtering. More specifically, such plurality of pairs consists of the first pair ($T_1$) of targets $TA_1$ and $TB_1$ and the second pair ($T_2$) of targets $TA_2$ and $TB_2$. The target holders 411, 412, and 413, are secured to the side walls 410A and 410B (FIG. 8) of the vacuum vessel 410 and are spaced at a predetermined distance therebetween. The first pair ($T_1$) and second pair ($T_2$) are therefore arranged in a row. The targets $TB_1$, $TA_2$ are secured to a single target holder, i.e., the target holder 412. The target holders 411, 412, and 413 are nonmagnetic and hollow, and the conduits 411A, 412A, and 413A for water cooling are inserted into the hollow spaces thereof. That is, holding and cooling of the targets $TA_1$, $TA_2$, $TB_1$, and $TB_2$ are achieved by a rather compact means.

The permanent magnets are denoted by 442, 443, and 444 and are arranged so as to generate a magnetic field only between the opposed targets and which is directed perpendicular to the surface of the targets. Since each permanent magnet has a cylindrical shape, the magnetic field (not shown) is generated in the form of a cylindrical wall between the opposed targets. Magnetic field-generating means, such as the permanent magnets 442, 443, 444, are located behind the targets $TA_1$, $TA_2$, $TB_1$, $TB_2$ and the polarities of all of the permanent magnets are preferably oriented in the same direction, as is shown in FIG. 7. A pair of targets $TB_1$ and $TA_2$, which are arranged in a portion other than the end portions of the vacuum vessel, is provided with a common magnetic field-generating means, i.e., the permanet magnet 443, and is secured to both ends of a common target holder, i.e., target holder 412.

A nonmagnetic base-conveying means 470 (FIG. 7) is adaptable for conveying a long, flexible strip of macromolecular material. More specifically, the nonmagnetic base-conveying means 470 comprises a reel 480, from which the nonmagnetic base 420 (FIG. 7) is uncoiled, and rotatable conveying rollers 481U, 482U, 483U, 481D, 482D, and 483D which define a U-shaped conveying pass of the nonmagnetic base 420, and a coiler 490 which coils the nonmagnetic base 420 at a predetermined speed. The rotatable tensioning rollers 491U, 492U, 493U, 491D, 492D, and 493D are secured to the side walls 410A and 410B (only the rotatable conveying rollers 491D and 493D are shown in FIG. 8). These rotatable tensioning rollers are arranged so that the nonmagnetic base 420 successively passes the upper and lower ends of the spaces $S_1$ and $S_2$ between the opposed targets $T_{A1}$, $T_{A2}$, $T_{B1}$, and $T_{B2}$. The nonmagnetic base-supporting plates 421U, 422U, 421D, and 422D are arranged beside the above-mentioned upper and lower sides of the spaces $S_1+S_2$, and when the nonmagnetic base 420 slides on the plates, it may be heated or cooled by heating or cooling equipment (not shown) installed behind the plates. The heating means may be an electric heater or a heating-medium circulating means. The cooling means may be a cooling-medium circulating means. Rotatable tensioning rollers 491U, 492U, 493U, 494U, 491D, 492D, 493D, and 494D are arranged in front of and behind the nonmagnetic base-supporting plates 421U, 422U, 421D, and 422D so as to bring the nonmagnetic base 420 into a tight contact with the supporting plates when the nonmagnetic base 420 is being conveyed. Shields are denoted by 446, 447, and 448 and surround the target holders 411, 412, and 413. The opposed-targets sputtering device is provided with the power sources 459, and 461.

The first and second pairs $T_1$ and $T_2$ of targets may comprise targets having the same composition. In this case, the deposition rate of a magnetic film can be four times as high as that attained by the opposed-targets sputtering device shown in FIG. 1.

The nonmagnetic base 420 is subjected to the deposition of a magnetic film on both the upper and the lower ends of the spaces $S_1$ and $S_2$. As a result, the rate deposition of the magnetic film per one pair of opposed targets is twice as high as that attained in the opposed targets sputtering device shown in FIG. 1.

Referring to FIG. 9, the nonmagnetic base-supporting plate 421D is illustrated. The nonmagnetic base-supporting plate 421D is electrically insulated from the vacuum vessel (not shown) and is electrically connected to the power sources $B_1$, $B_2$ and $B_3$. The nonmagnetic base-supporting plate 421D is separated by the electrically insulating bodies I into three electrode sections $E_1$, $E_2$, and $E_3$, which are connected to the power source $B_1$, $B_2$, and $B_3$, respectively. A bias potential determined by each of the power source $B_1$, $B_2$, and $B_3$ is applied to each of the electrode sections $E_1$, $E_2$, and $E_3$. A negative bias potential decreases the impact energy of the gamma electrons and the like when they are deposited on the nonmagnetic base 420. On the other hand, a positive bias potential increases the impact energy of the gamma electrons and the like when they are deposited on the nonmagnetic base 420. Since the kinetic energy of the gamma electrons and the like is not uniform within the space between the targets $T_{A1}$ and $T_{B1}$, the rate deposition of the magnetic film on the nonmagnetic base 420 tends to be nonuniform. The nonmagnetic base-supporting plate 421D shown in FIG. 9 is advantageous for forming a magnetic film which has a sensitive crystal structure, such as a Co-Cr alloy film.

Referring to FIG. 10, individual permanent magnets 445a and 445b are arranged in the target holder 412. Therefore, each target is provided with one magnetic field-generating means.

It is preferred in the opposed targets sputtering device according to the present invention that the magnetic field-generating means comprise: a first means for generating a magnetic field around a pair of targets, said first means having such a configuration as to surround the pair of targets; and a second means for producing a magnetic flux, said second means being connected to said first means via a magnetic path formed between the first and second means.

Referring to FIG. 11, the opposed-targets sputtering device is provided with a pair of targets $T_1$ and $T_2$, target holders 311 and 312, and conduits 311a and 312a. The vacuum vessel is denoted by 310. The first means comprise cores 301 and 302, which are electrically connected to the vacuum vessel 310. The cores 301 and 302 have the same configuration as the shields 17, 18 in FIG. 1 and may be cylindrical. The insulating spacers 315 and 316 are inserted between the cores 301 and 302 and the target holders 311 and 312, so that a distance of a few millimeters is created. The cores 301 and 302 are provided at the top ends thereof with front portions 301a and 302a, which are opposed and between which a magnetic field is generated. The cores 301 and 302 and their front portions 301a and 302a may be made of mild steel, silicon steel, Permalloy, or other soft magnetic materials having a high permeability and a high saturation magnetization. The second means may be a magnetizing coil or a permanent magnet. In FIG. 11, the second means are two magnetizing coils 301' and 302' which are located outside the vacuum vessel 310. When the magnetizing coils 301' and 302' mounted on the cores 301 and 302 are energized, the cores 301 and 302 produce a magnetic field H. The intensity of the magnetic field H can be easily adjusted by controlling the current of the magnetizing coils 301' and 302'.

It is preferred in the opposed-targets sputtering device according to the present invention that one end of a magnetic-field generating means said end being closest to the targets, consist of soft magnetic material having a high permability. Referring to FIG. 10, for example, the permanent magnet 445a comprises a magnet body 445a' and a tip 446a which consists of soft magnetic material having a high permeability and a high saturation magnetization. Since the demagnetizing field induced in the permanent magnet 445a, can be decreased by the tip 446a, the magnetic flux is concentrated around the outer periphery of the target $T_{B1}$. Erosion of targets $TA_2$ and $TB_1$ can be uniformly eroded; but this is not the case when the cylindrical permanent magnet 445b is used. It is preferred that the tip have a pointed configuration at its outside front end.

Referring to FIGS. 14, and 15, it is illustrated how the erosion to targets made of Co-20 wt. % Cr alloy is varied by changing the construction of the magnetic field generating means. Symbols used in these figures indicate the following.

$TG_1$: The permanent magnets were as shown in FIG. 1 and the sputtering power was 1045 w.

$TG_2$: The permanent magnets were as shown in FIG. 10 were used and the sputtering power was 1027 w.

$TG_3$: The magnetic field generating means as shown in FIG. 11 was used and the sputtering power was 1079 w.

It will be apparent that in $TG_3$ erosion of the target is the most uniform Distribution of erosion and magnetic flux over the target in $TG_2$ are very uniform as compared with those of $TG_1$.

The method for producing the two-layer film according to the present invention may be carried out by using not only the opposed-targets sputtering devices shown in FIGS. 1, 7, 8, and 11 but also by using the opposed-targets sputtering devices shown in FIGS. 12 and 13. In FIG. 12, the same members as those in FIG. 1 are denoted by the same reference numerals. The magnetic-field generating means in FIG. 12 is a magnetizing coil 430 disposed outside the vacuum vessel 10. The opposed targets sputtering device shown in FIG. 13 is provided with the first and second means described with reference to FIG. 11 and the nonmagnetic-base conveying means described with reference to FIGS. 7 and 8, as will be apparent from the reference numerals given in these drawings. It should be understood that the opposed-targets sputtering devices shown in FIGS. 1, 7, 8, 11, 12, and 13 are not limitative at all for carrying out the method of the present invention.

In carrying out the method of the present invention, it is preferred that the Co-Cr alloy layer be formed on the Co-Ta alloy layer no later than ten hours after formation of the Co-Ta alloy layer. The Co-Cr alloy layer is highly likely to peel off of the Co-Ta alloy layer if the nonmagnetic base having Co-Ta alloy layer thereon is cooled in vacuum to room temperature, is taken out of the opposed target sputtering device, is exposed to ambient air for a long period of time, and is subsequently subjected to the formation of Co-Cr alloy layer. The surface, of these alloy layers are very smooth. If the exposure time of the Co-Ta alloy layer to the ambient air is less than ten hours, the adhesion of the Co-Ta alloy layer and the Co-Cr alloy layer is acceptable practically. If the Co-Ta alloy layer is not at all exposed to the ambient air and the Co-Cr alloy layer is immediately formed on the Co-Ta alloy layer, the adhesion is excellent.

The present invention is now explained by way of examples.

EXAMPLE 1

Samples of the perpendicular magnetic recording medium were prepared under the following conditions:

A. The opposed-Targets Sputtering Device (FIG. 1)
(1) Material of the Targets $T_1$, $T_2$: Target $T_1$ (100 atomic % Co), Target $T_2$ (100 atomic % Co - I (Co) - and 100 atomic % Ta - II (Co) -.
(2) Distance Between the Targets $T_1$, $T_2$: 75 mm
(3) Magnetic Field in the Neighborhood of the Targets $T_1$, $T_2$: 100~200 gausses
(4) Dimension of the Targets $T_1$, $T_2$: 110 mm in diameter (Round Disc Targets)
(5) Distance of the Nonmagnetic Base 40 From the Ends of the Targets $T_1$, $T_2$: 30 mm B. Nonmagnetic Base 40:

A 25 μm thick Capton film (Aromatic polyimide film produced by Dupont by the tradename of Capton) and a 16 μm thick polyethylene terephthalate (PET) film (Both of these films were used in the experiments) were produced.

The two-layer fims were produced by the following procedure.

The nonmagnetic base 40 was first fixed on the base holder 41 and then the gas in the vacuum vessel 10 was exhaused until an ultimate degree of vacuum of $1\times10^{-6}$ Torr or less was achieved. Subsequently, an argon gas was admitted into the vacuum vessel 10 until the pressure was increased to 4 mm Torr. After pre-sputtering for three to five minutes, the shutter (not shown in FIG. 1) was retracted and the formation of a Co-Ta alloy layer on the nonmagnetic base 40 was initiated. The electric power during sputtering was 250 w or 500 w and a 0.55 μm thick Co-Ta alloy layer was formed. This procedure was repeated while varying the Ta concentration of the Co-Ta alloy layers. The coercive force in plane $H_c$ and the saturation magnetization $M_s$ of the produced Co-Ta alloy layers were measured. The results are shown in FIG. 3.

As will be apparent from FIG. 3, the coercive force in plane $H_c$ was 100 Oe or more and the saturation magnetization was 1100 emu/cc or more when the Ta concentration of the Co-Ta alloy was 15% by weight (5.4 atomic %) or less. The coervice force in plane $H_c$ and the saturation magnetization $M_s$ decreased with an increase in the Ta concentration. The Co-Ta alloy had an excellent soft magnetic property, i.e., a coercive force in plane $H_c$ of 5 Oe or less, when the Ta concentration was 23% by weight (8.9 atomic %) or more.

The Co-Ta alloy layers were subjected to X-ray diffraction analysis. When the Ta concentration was 22% by weight (8.4 atomic %) or less, the diffraction peak was at an angle ($2\theta$) of from 43.80 to 44.02. When the Ta concentration was 23% by weight or more, a diffraction peak was not detected, thus revealing the Co-Ta alloy layer to be amorphous.

Measurement of the resistivity also revealed the Co-Ta alloy layer containing 23% by weight or more of Ta to be amorphous.

The properties of several samples are given in Table 1 below.

TABLE 1

| Sample No. | Base | Ta Concentration wt % | Diffraction Peak | $H_c$ (Oe) |
|---|---|---|---|---|
| I - 1 | Capton | 9.2 | Detected | 121 |

TABLE 1-continued

| Sample No. | Base | Ta Concentration wt % | Diffraction Peak | $H_c$ (Oe) |
| --- | --- | --- | --- | --- |
| I-2 | PET | 22.5 | Detected | 9.3 |
| I-3 | Capton | 23.5 | None | 2.0 |
| I-4 | PET | 24.0 | None | 0.5 | the half-value width $\Delta\theta_{50}$ of the two-layer films was very low, e.g. 5 degree, and could be decreased more than that of the single-layer films, when the Co-Ta alloy layer of the two-layer films had an amorphous structure.

The properties of several samples are given in Table 2.

TABLE 2

| Sample No. | Nonmagnetic Base | Co—Ta Alloy Layer | | | Co—Cr Alloy Layer | |
| --- | --- | --- | --- | --- | --- | --- |
| | | Ta Concentration (wt %) | Diffraction Peak | Remarks | Diffraction Peak | Diffraction Peak $\Delta\theta_{50}$ |
| II-1 | Capton | — | — | Single | 44.51° | 3.5° |
| II-2 | " | 9.2 | 43.94 | No. I-1 | None | — |
| II-3 | " | 15.8 | 43.85 | — | 44.53 | 8.7 |
| II-4 | " | 23.5 | None | No. I-3 | 44.55 | 3.0 |
| II-5 | " | 23.6 | None | — | 44.54 | 2.6 |
| II-6 | PET | — | — | Single | 44.57 | 4.2 |
| II-7 | " | 22.5 | None | No. I-2 | 44.60 | 3.7 |
| II-8 | " | 38.8 | None | — | 44.58 | 3.6 |

Remarks
(1) The diffraction Peak of a (002) plane was measured and is given by angle ($2\theta$).
(2) "Single" indicates a one-layer film.

EXAMPLE 2

Figure 4:
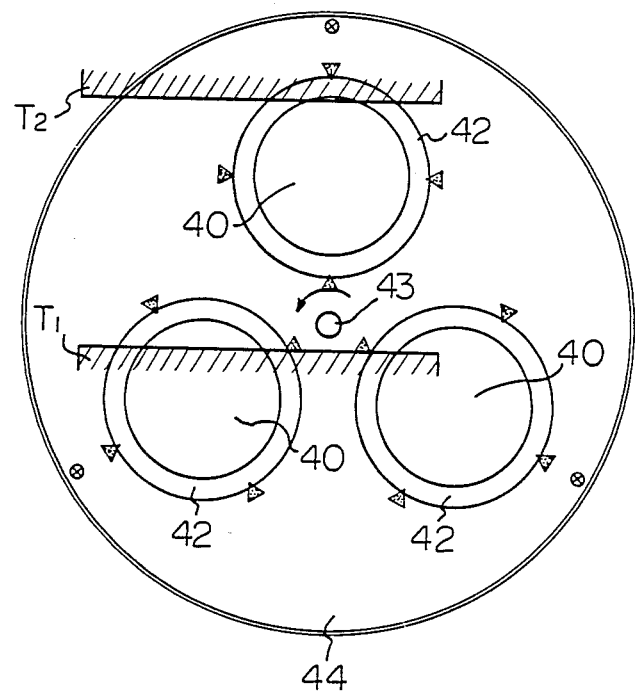
FIG. 4 is a means for holding a nonmagnetic base.

The nonmagnetic bases on which a Co-Ta alloy layer was formed according to the procedure of Example 1 were cooled in a vacuum down to room temperature and then were removed from the opposed-targets sputtering device. In each experiment, three of the nonmagnetic bases 40 were mounted on the base holder 41 (FIG. 4) and the Co-Cr alloy layer was formed on the Co-Ta alloy layer. The Co-Cr alloy layer was formed under the following conditions:

A. The Opposed-Targets Sputtering Device (FIG. 1)
(1) Material of the Targets $T_1$, $T_2$: Co-Cr alloy containing 17% by weight of Cr
(2) Distance Between the Targets $T_1$, $T_2$: 100 mm
(3) Magnetic Field in the Neighborhood of the Targets $T_1$, $T_2$: 100~200 gauss
(4) Dimension of the Targets $T_1$, $T_2$: 150 mm × 100 mm × 10 mm (thickness)
(5) Distance of the Nonmagnetic Base 40 From the Ends of th Targets $T_1$, $T_2$: 50 mm
(6) Target holder (FIG. 4)-three nonmagnetic bases 40 were mounted on holders 42 which were secured on a holding body 44 which was rotated around a rotatable driving shaft 43. The rotatable driving shaft 43 were rotated at an almost constant speed.

B. Nonmagnetic Base 40

A 25 μm thick Capton film and a 16 μm thick polyethylene terephthalate (DET) film. The Co-Ta alloy layer was formed on these films by the same procedure as that used in of Example 1, except that the target holder 40 was rotated at 40 rpm and the sputtering power was 1000 w. For the purpose of comparison, one-layer films were produced by the procedure described above.

The half-value width $\Delta\theta_{50}$ of the Co-Cr alloy layer of the two-layer films and the one-layer films was measured. The results are shown in FIG. 5. As is apparent from FIG. 5, the half-value width $\Delta\theta_{50}$ of two-layer films is very excellent when the Ta concentration (3 degree) is 23% by weight or more. A Ta concentration of 23% by weight corresponds to the structural change of the Co-Ta alloy, i.e., the crystal structure is changed to an amorphous structure and vice versa. Surprisingly, As is apparent from Table 2, the Co-Ta alloy is crystalline when the Ta-concentration is 22% by weight (8.4 atomic %) or less. The crystal structure of the Co-Ta alloy is an hcp structure and the Co-Ta crystals are oriented along the C-axis of the hcp structure. The distance between the C planes of the Co-Ta crystals is greater than that of the Co crystals.

The surface and cross section patterns of two-layer films was investigated by means of a diffraction electron microscope produced by Japan Electron Co., Ltd. (JSM-35C type).

The specimens for observing the surface pattern were prepared by depositing an Au-Pd layer on the perpendicular magnetic recording layers to a thickness of approximately 200 Å. Electron microscopic photographs were taken at a magnification of 40,000 and under an acceleration voltage of 25 kV. The specimens for observing the cross section pattern were prepared by putting the two layer films into a gelation capsule together with ethyl alcohol, cooling the capsule with liquid nitrogen for two hours, and then cleaving the capsule with a cleaving knife. The device used for the freeze-cleaving method was a TF-1-type device produced by Eiko Engineering Co., Ltd.

The surface pattern of the Co-Cr alloy layer was composed of uniform particles of 500 Å or less in size and the cross section patterns of the Co-Cr alloy layer and the Co-Ta alloy layer exhibited virtually no grain boundaries and were composed of a few fragmented particles which were dispersed. A very flat boundary was observed between the Co-Cr alloy layer and the Co-Ta alloy layer. The adhesion of these layers to each other was tested by changing the time between the completion of formation of the Co-Ta alloy layer and the initiation of formation of the Co-Cr alloy layer. When the Co-Ta alloy layer was exposed to the ambient air for a few days, the above-mentioned adhesion was very poor and the Co-Cr alloy layer was very susceptible to peeling. A satisfactorily high adhesion could be obtained by keeping the exposure time shorter than ten hours.

EXAMPLE 3

The procedure of Example 2 was repeated except for the following:

A. Distance of the Nonmagnetic Base 40 From the Ends of the Targets: 25 mm

B. Target Holders:

The holders 42 were provided with a cooling means (not shown in FIG. 4) located behind them.

C. The nonmagnetic bases 40 were kept stationary during sputtering. The electric power amounted to 5 kW at the highest during sputtering and the thickness of the Co-Cr alloy layer was approximately 0.5 μm. The deposition rate was varied in the range of from approximately 0.1 μm/min to approximately 0.7 μm/min.

The relationship between the half-value width $\Delta\theta_{50}$ and the deposition rate (Rd) is shown in FIG. 6. In FIG. 6, the symbols ○ and ● indicate one-layer films and two-layer films, respectively, in which a PET film was used as the nonmagnetic base 40. As is apparent from FIG. 6, it is possible to produce two-layer films having an excellent half-value width $\Delta\theta_{50}$ at a high deposition rate of up to approximately 0.7 μm/min by using a PET film as the nonmagnetic base.

In the present example, the influence of cooling upon the properties of two-layer films was tested. In the test, the holders 42 (FIG. 4) were made of a stainless steel sheet having a surface roughness of from 0.1S to 0.6S and the nonmagnetic bases 40 were cooled via the holders 42, behind which a cooling chamber (not shown) was defined. The temperature of the holders 42 was varied in the range of from 25° C. to 80° C., and the vertical coercive force $H_{cv}$ of the Co-Cr alloy layer was varied from 200 to 400 Oe.

When the holders 42 made of a mat- or satin-finished stainless steel sheet was used in the test mentioned above the temperature of the holders was 25° C., vertical coercive force $H_{cv}$ was 830 Oe. In this case, the deposition rate was 0.3 μm/min.

In the case of both the holders made of a 0.1S–0.6S stainless steel sheet and the holders made of a satin-finished stainless steel sheet, the half-value width $\Delta\theta_{50}$ was approximately 3 degrees.

EXAMPLE 4

A conventional two-layer film and a two-layer film according to the present invention were prepared according to the procedure of Example 2.

The layer of low coercive-force material of the conventional two-layer film consisted of an alloy comprised of 4% Mo, 78% by weight of Ni, and 18% by weight of Fe. The Co-Ta alloy layer of the two-layer film according to the present invention contained 30% by weight of Ta. The properties of these films are given in Table 3.

TABLE 3

| | Layer of Low Coercive-Force Material | | Co—Cr Alloy Layer | | |
|---|---|---|---|---|---|
| Sample No. | Thickness (μm) | Coercive Force in plane (Oe) | Thickness (μm) | Vertical Coercive Force ($H_{cv}$) (Oe) | Half-Value Width $\Delta\theta_{50}$ (degree) |
| IV - 1 | 0.5 | 1.0 | 0.5 | 230 | 3.0 |
| IV - 2 | 0.4 | 1.0 | 0.5 | 360 | 10 |

The recording characteristic of the above-mentioned two films was measured by using the perpendicular magnetic head described in IEEE Trans. on Mag., Vol. MAG-16, No. 1, Jan. 1980, page 71.

The regenerating peak-to-peak voltage was measured while the kilo flux reversal per inch (KFRPI) was varied from 1.0 to 100. The results are given in Table 4.

TABLE 4

| | Recording Condition (KFRPI) | | | | | | |
|---|---|---|---|---|---|---|---|
| Sample No. | 1.0 mV | 2.0 mV | 5.0 mV | 10 mV | 20 mV | 50 mV | 100 mV |
| IV - 1 (Invention) | 160 | 160 | 160 | 150 | 150 | 140 | 80 |
| IV - 2 (Prior art) | 240 | 240 | 230 | 210 | 160 | 90 | 25 |

As is apparent from Table 4, when the recording condition in terms of KFRPI was from 1 to 5, the regenerating peak-to-peak voltage of Sample No. IV-1 was higher than that of Sample No. IV-2. This was due to the fact that the vertical coercive force $H_{cv}$ of Sample No. IV-2 was higher than that of Sample No. IV-1. However, the peak-to-peak regenerating voltage of Sample No. IV-2 drastically decreased when the KFRPI was 50 or more. Sample No. IV-1 did not exhibit such a drastic decrease at all, and it is believed that the reason for this was an excellent half-value width $\Delta\theta_{50}$.

EXAMPLE 5

The nonmagnetic bases on which a Co-Ta alloy layer was formed according to the procedure of Example 1 (Sample No. I-4) were cooled in a vacuum down to room temperature and then were removed from the opposed-targets sputtering device.

The procedure of Example 1 was repeated for forming a Co-Cr alloy layer except that the following was changed.

(1) Target $T_1$: A Ta plate consisting of 100% of Ta was positioned on a portion of the Co-Cr alloy plate containing 17 atomic % of Cr (2) Target $T_2$: A plate consisting of Co-Cr alloy containing 17 atomic % of Cr (3) Distance between Targets $T_1$, $T_2$: 120 mm (4) Dimension of Targets $T_1$, $T_2$: 150 mm × 100 mm × 10 mm (Thickness)

(5) Distance of Nonmagnetic Base 40 From the Ends of Targets $T_1$, $T_2$: 50 mm (6) Distance of the Nonmagnetic Base 40 From the Ends of the Targets $T_1$, $T_2$: 50 mm During sputtering the electric power was 1000 w and the argon gas pressure in the vacuum vessel was $4 \times 10^{-3}$ Torr. As a result of sputtering, a 0.5 μm thick Co-Cr alloy layer which contain Ta was formed. The Ta concentration of Co-Cr alloy layer was varied by changing the size of the Ta plate. For the purpose of comparison, a one layer-film was produced and 16 μm thick PET film by the procedure described above.

The two-layer films and the one-layer film produced were subjected to measurement of the perpendicular coercive force Hcv, the coercive force in plane Hc, the perpendicular residual magnetization, Mrv, the residual magnetization in plane Mrh, and the anisotropic magnetic field Hk. The results are shown in Table 5.

TABLE 5

| Sample No. | Nonmagnetic Base | Composition (atomic %) | | | $\Delta\theta_{50}$ | Hcv/Hch | Mrv/Mrh | Hcv (Oe) | Hk (KOe) | Remarks |
|---|---|---|---|---|---|---|---|---|---|---|
| | | Co | Cr | Ta | | | | | | |
| V-1 | PET | 80.9 | 16.3 | 2.8 | 4.8 | 0.61 | 0.18 | 62 | 1.6 | |
| V-2 | " | 79.9 | 16.3 | 3.8 | 3.6 | 3.08 | 1.18 | 222 | 2.5 | |
| V-3 | " | 79.4 | 16.5 | 4.1 | 4.3 | 7.41 | 2.54 | 335 | 2.2 | |
| V-4 | " | 77.6 | 16.6 | 5.8 | 4.4 | 5.96 | 2.65 | 402 | | Two Layer Films |
| V-5 | " | 77.9 | 16.0 | 6.1 | 5.6 | 2.06 | 0.92 | 175 | 1.7 | |
| V-6 | " | 77.3 | 15.6 | 7.1 | 4.5 | 1.45 | 0.81 | 123 | 2.2 | |
| V-7 | " | 77.0 | 15.5 | 8.5 | 4.7 | 1.50 | 0.82 | 65 | 1.2 | |
| V-8 | " | 83 | 17 | 0 | 3.5 | 0.81 | 0.25 | 145 | 2.4 | One-Layer Film |

As is apparent from Table 5, the half value width $\Delta\theta_{50}$ of the Co-Cr alloy layer containing Ta is slightly inferior to but is virtually the same as that of the Co-Cr alloy layer of the one-layer film. The half value width $\Delta\theta_{50}$ of the Co-Cr alloy layer containing Ta is not deteriorated greatly due to the layer of low coercive force material.

As is apparent from Hcv/Hc and Mrv/Mrh given in Table 5, the perpendicular orientation of the two-layer films is considerably improved over that of the one-layer film, when the Ta concentration of Co-Cr alloy is from 3.8 atomic % to 7.1 atomic %. This makes it possible to enhance the recording density and recording sensitivity as compared with those of a known one-layer film.

We claim:

1. A sputtering device comprising: a vacuum vessel; at least one pair of rectangular targets arranged in the vacuum vessel so that their long sides are opposed; at least one means for generating a magnetic field along the perimeter of each of said rectangular targets in a direction perpendicular to the targets, each of said magnetic-field generating means having an end portion thereof positioned close to one of said targets, each end portion constituted by a tip made of high permeability soft magnetic materials, said tip having an outside front and being shaped into a point at the outside front end thereof; and a base-conveying means for conveying a nonmagnetic base arranged adjacent to the long sides of said at least one pair of said rectangular targets so that the nonmagnetic base faces a space between said at least one pair of the targets in a direction perpendicular to the long side of said targets, and so that layers having the same composition of said targets are deposited on said nonmagnetic base by sputtering.

2. A sputtering device comprising: a vacuum vessel; at least one pair of rectangular targets arranged in the vacuum vessel so that their long sides are opposed; at least one means for generating a magnetic field outside and along the perimeter of each of said at least one pair of rectangular targets in a direction perpendicular to the targets, each of said magnetic-field generating means comprising first means for guiding a magnetic flux around each of said targets with a configuration such that each of said targets is surrounded thereby, and second means for producing a magnetic field and connected to said first means via a magnetic path formed therebetween; and base-conveying means for conveying a nonmagnetic base arranged adjacent to the long sides of said at least one pair of said rectangular targets so that the nonmagnetic base faces a space between said at least one pair of the targets in a direction perpendicular to the long sides of said targets, and so that layers having the same composition of said targets are deposited on said nonmagnetic base by sputtering.

3. A sputtering device according to claim 2, wherein said second means is a magnetizing coil.

4. A sputtering device according to claim 2, wherein said second means is a permanent magnet.

* * * * *